United States Patent Office 3,553,270
Patented Jan. 5, 1971

3,553,270
PREPARATION OF PHENOLIC THIOETHERS
John C. Wollensak and Bernard R. Meltsner, Royal Oak, Mich., assignors to Ethyl Corporation, New York, N.Y., a corporation of Virginia
No Drawing. Filed Dec. 22, 1967, Ser. No. 692,658
Int. Cl. C07c 149/36; C08c 13/08
U.S. Cl. 260—609
10 Claims

ABSTRACT OF THE DISCLOSURE

The reaction of phenols unsubstituted in at least one position ortho or parato the hydroxyl group with formaldehyde and mono- or dimercaptans yields, respectively, α-(hydrocarbylthio)-cresols or α,α'-alkylene dithiobis compounds. For example, the reaction of 2,6-di-tert-butylphenol with formaldehyde and dodecyl mercaptan yields 2,6-di-tert-butyl-α-(dodecylthio)-p-cresol. The products are useful as antioxidants.

BACKGROUND

In U.S. Pats. 2,322,376 (June 22, 1943) and 2,417,118 (Mar. 11, 1947), R. F. McCleary and S. M. Roberts disclosed as new compounds useful as lubricating oil additive compounds of the type:

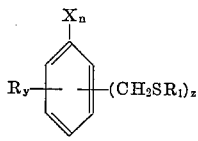

whereinR is a radical selected from the group consisting of hydrogen and a hydrocarbon radical, $R_1$ is a hydrocarbon radical, X is a substituent selected from the group consisting of hydroxyl radicals and metal substituted hydroxyl radicals, and $n$, $y$ and $z$ are integers of at least one. The methods used to prepare these compounds were (a) the reaction of a phenolic compound with formaldehyde and an alkyl mercaptan, and (b) the reaction of a phenolic Mannich base with a mercaptan.

The method mentioned by McCleary and Roberts of a direct reaction between a phenol, formaldehyde and a mercaptan is operable on 2,6-dialkylphenols only with an alkaline catalyst. However, it tends to give colored products and, especially with the less hindered 2,6-dialkylphenols, is complicated by a side reaction leading to a methylene bisphenol. On 2,4-dialkylphenols, the reaction gives poor yields, also being complicated by a side reaction leading to the methylene bisphenol.

The method mentioned by McCleary and Roberts of a reaction between a phenolic Mannich base and the mercaptan requires long reaction periods (a 35-hour reflux is mentioned in one example).

In U.S. Pat. 3,260,758 (July 12, 1966), F. X. O'Shea et al. disclosed another method of preparing dialkyl hydroxybenzyl alkyl sulfides which requires first the preparation of an intermediate dialkyl (dithiocarbamylmethyl)phenol followed by the reaction of this intermediate with an alkyl mercaptan and an alkali metal hydroxide. The present method avoids theh necessity of preparing a dialkyl (dithiocarbamylmethyl)phenyl intermediate. Preparation of this intermediate involves the use of carbon disulfide as described in U.S. Pat. 2,754,174 (July 31, 1956), which is hazardous chemical due to its extremely low ignition temperature.

SUMMARY

This invention relates to a process for preparing α-(hydrocarbylthio)cresols and α,α'-alkylene dithiobis cresols. The new process avoids problems encountered in prior methods because it gives high yields without the concurrent side reactions leading to methylene bisphenols and it does not require the preparation of an intermediate compound, but is capable of preparing the desired products directly from the phenol.

Accordingly, an object of this invention is to provide a simple method of preparing α-(hydrocarbylthio)cresols and α,α'-alkylene dithiobis cresols which are useful as antioxidants in rubber.

DESCRIPTION OF THE PREFERRED EMBODIMENTS

The objects of this invention are accomplished by providing a process for preparing compounds having the formulas:

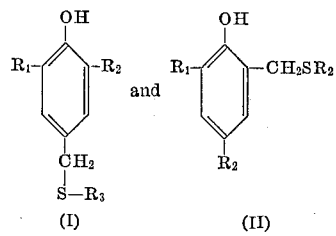

wherein $R_1$ and $R_2$ are selected from the group consisting of alkyl radicals containing 1 to 12 carbon atoms, aralkyl radicals containing 7 to 12 carbon atoms and cycloalkyl radicals containing 6 to 12 carbon atoms, and $R_3$ is selected from the group consisting of alkyl radicals containing 1 to 20 carbon atoms, cycloalkyl radicals containing 6 to 20 carbon atoms, aryl radicals containing 6 to 20 carbon atoms, aralkyl radicals containing 7 to 20 carbon atoms, and radicals having the formulas:

(III)

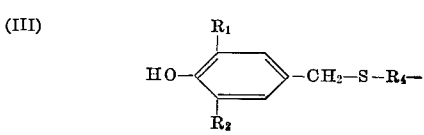

and
(IV)

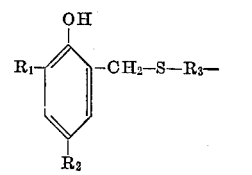

wherein $R_1$ and $R_2$ are the same as above and $R_4$ is a divalent aliphatic hydrocarbon radical containing from 2 to 12 carbon atoms, said process comprising reacting a phenol selected from the group consisting of phenols having the formulas:

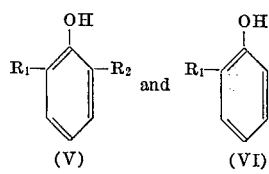

wherein $R_1$ and $R_2$ are the same as above, with formaldehyde and a mercaptan selected from the group consisting of mercaptans having the formulas:

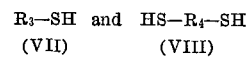

wherein $R_3$ and $R_4$ are the same as above, in the presence of an acid or base catalyst at a temperature of from about 50 to 200° C.

Examples of phenol reactants useful in the process are:

2,6-dimethylphenol
2,6-diisopropylphenol
2,6-di-tert-butylphenol
2,6-di-sec-amylphenol
2,6-di-tert-dodecylphenol
2-methyl-6-tert-butylphenol
2-methyl-6-sec-dodecylphenol
2-ethyl-6-isopropylphenol
2,6-dicyclohexylphenol
2,6-di(α-methylbenzyl)phenol
2-methyl-6-(α,α-dimethylbenzyl)phenol
2-tert-butyl-6-(α-methylbenzyl)phenol
2,4-dimethylphenol
2,4-diisopropylphenol
2,4-di-tert-butylphenol
2,4-di-tert-hexylphenol
2,4-di-sec-dodecylphenol
2,4-dicyclohexylphenol
2,4-di(α-methylbenzyl)phenol
2,4-di(α,α-dimethylbenzyl)phenol
2-methyl-4-tert-butylphenol
2-tert-butyl-4-methylphenol
2-(α-methylbenzyl)-4-methylphenol
2-ethyl-4-tert-octylphenol
2-methyl-6-cyclohexylphenol.

The preferred phenol reactants are the 2,6-dialkylphenols such as 2,6-dimethylphenol, 2,6-diethylphenol, 2-methyl-6-tert-butylphenol, and the like. The more preferred phenols are the 2,6-di(α-branched alkyl)phenols wherein the α-branched alkyl group contains from 3 to 12 carbon atoms. By alpha-branched is meant that the alkyl group is a secondary or tertiary radical. Examples of these more preferred alkyl groups are 2,6-di-tert-butylphenol, 2,6-di-sec-butylphenol, 2,6-dicyclohexylphenol, 2,6-diisopropylphenol, 2,6-di-tert-dodecylphenol, and the like.

Examples of mono-mercaptans having Formula VII include methyl mercaptan, ethyl mercaptan, n-propyl mercaptan, n-butyl mercaptan, isobutyl mercaptan, 3-methylhexyl, mercaptan, n-decyl mercaptan, 2,2,4-tri-methylpentyl mercaptan, n-dodecyl mercaptan, n-eicosyl mercaptan, cyclohexyl mercaptan, 4-methylcyclohexyl mercaptan, 4-tert-octylcyclohexyl mercaptan, phenyl mercaptan, 4-methylphenyl mercaptan, 2,4-diethylphenyl mercaptan, 4-sec-dodecylphenyl mercaptan, benzyl mercaptan, α-methylbenzyl mercaptan, α,α-dimethylbenzyl mercaptan, 4-tert-butyl-α-methylbenzyl mercaptan, and the like.

The preferred mercaptans of Formula VII are the simple alkyl mercaptans such as methyl mercaptan, n-decyl mercaptan, n-dodecyl mercaptan, and sec-eicosyl mercaptan. Especially preferred alkyl mercaptans are those containing from about 6 to 20 carbon atoms such as n-hexyl mercaptan, 2,2,4-tri-methylpentyl mercaptan, n-decyl mercaptan, n-dodecyl mercaptan, sec-dodecyl mercaptan, n-octadecyl mercaptan, eicosyl mercaptan, 2-methylheptadecyl mercaptan, and the like.

Examples of dimercapto reactants having Formula VIII include ethylene mercaptan, 1,3-mercaptopropane, 1-methylethylene mercaptan, 2,2-dimethyl-1,3-dimercaptopropane, 1,6-dimercaptohexane, 1,4-dimercapto cyclohexane, 1,5-dimercapto cyclooctane, 1,6-dimercapto-2,5-diisopropylhexane, and the like. The most preferred dimercapto reactant of Formula VIII is ethylene mercaptan.

The process can be carried out by merely mixing the phenol, formaldehyde and mercaptan and heating. Preferably an acid or base catalyst is added to the reaction as this promotes the reaction rate. Typical acid catalysts include both organic and minearl acids such as formic acid, acetic acid, oxalic acid, p-toluene sulfonic acid, sulfuric acid, hydrochloric acid, phosphoric acid, and the like. It is preferred that a base catalyst be employed. Although strongly basic amines such as trimethyl amine can be used, it is preferred to employ an inorganic base. Especially useful are the alkali metal hydroxides such as lithium hydroxide, sodium hydroxide, potassium hydroxide, and the like. Of these, the most preferred catalyst is potassium hydroxide.

The amount of catalyst employed does not appear to be critical as long as the catalytic amount is present. When using an alkali metal hydroxide, good results are obtained when from about 0.005 to 0.1 mole of alkali metal hydroxide is used per mole of phenol reactant.

Although the reaction can be conducted without any solvent, it is generally preferred to use a solvent. Useful solvents are those that have some solvent effect on the reactants, but are substantially inert under the reaction conditions. Some examples are hydrocarbon solvents such as toluene, xylene, octane, β-terpene, and ethers such as dioxane, diethyl ether, dimethyl ether of ethylene glycol, tetrahydrofuran, and the like. Also, chlorinated hydrocarbons such as carbon tetrachloride, chloroform, trichloro ethane, perchloro ethylene, and the like, can be employed. Another solvent that can be used is dimethyl sulfoxide.

The preferred solvents are primary and secondary alcohols containing from 3 to 6 carbon atoms. Examples of these are isopropanol, sec-butyl alcohols, tert-butyl alcohols, sec-acyl alcohols, tert-amyl alcohols, sec-hexyl alcohols, and tert-hexyl alcohols.

The ratio of reactants should be adjusted to give the maximum yield of product at the least cost. When a monomercaptan reactant is used, good results are generally obtained when from 0.75 to 3 moles of formaldehyde and 0.9 to 3 moles of mono-mercaptan are used per mole of phenol reactant. The amount of mercaptan reactant used cannot be stated merely in terms of moles, but must be stated in terms of mole equivalents. The mole equivalent depends upon the number of mercaptan groups in the molecule. For example, when the mercaptan contains two mercapto groups per molecule the mole equivalent weight is one-half the mole weight. In other words, when a dimercaptan is used, the preferred reaction ratio is from 1.6 to 6 moles of formaldehyde and 0.9 to 3 moles of dimercaptan per two moles of phenol reactant.

The reaction temperature should be high enough to cause the reaction to proceed at a good rate, but not so high as to cause decomposition. The optimum temperature varies with reactants, but generally good results are obtained between 50 and 200° C. A preferred temperature range is from 50 to about 150° C. In practice, a good method of carrying out the process is to conduct it at the boiling point of the reaction mass. This affords an easy method of controlling temperature. Hence, a most preferred temperature range is from 50° C. to the boiling point of the reaction mixture.

The reaction will proceed by merely mixing the reactants in any order and heating to reaction temperature. However much better results are obtained if the mercaptan and formaldehyde are mixed and heated first and then the phenol added. Therefore, a preferred method is to mix the formaldehyde and mercaptan and generally an alkali metal hydroxide catalyst first, and then heat this mixture to a temperature above about 50° C. and then add the phenol. Here again, the formaldehydemercaptan catalyst mixture is preferably heated to a temperature from 50° C. to the boiling point of the mixture. When a solvent such as isopropanol is present the mixture is generally heated and stirred to the boiling point of isopropanol and then the phenol reactant added and the mixing continued at from 50° C. to the boiling point of the phenol mixture.

The reaction is usually complete in from about 1–8 hours after all the reactants have been added. A more preferred reaction time is from about 1–4 hours.

After the reaction is complete, the easiest way to recover the product is to merely water wash the reaction mixture to remove any catalyst and water-soluble materials including solvents and then to distill off other volatile components under vacuum, leaving the product as the residue. It is not necessary to distill the product because the material recovered by water washing and removal of lower boiling components is just as effective in antioxidant applications as the distilled product.

The following examples serve to illustrate methods of conducting the process. All parts are by weight unless otherwise specified.

EXAMPLE 1

In a reaction vessel fitted with stirrer, condenser, addition means, thermometer and provided with a nitrogen atmosphere was placed 10.3 parts of 2,6-di-tert-butylphenol, 100 parts of acetic acid, and 2 parts of 36 percent hydrochloric acid. To this mixture was then added 10.1 parts of 1-dodecanethiol. The mixture was heated to reflux and then, over a 15 minute period, 4.2 parts of 36 percent aqueous formaldehyde was added. The mixture was refluxed for 50 hours and then diluted with water. The product was extracted with diethyl ether and the ether evaporated, leaving 16 parts of a liquid product. Vapor phase chromatographic analysis showed this to contain 2,6-di-tert-butyl-$\alpha$-(n-dodecylthiol)-p-cresol.

EXAMPLE 2

To the reaction vessel described in Example 1 was added 90 parts of isopropanol, 2 parts of 86 percent potassium hydroxide, 10.3 parts of 2,6-di-tert-butylphenol and 10.1 parts of 1-dodecanethiol. Following this, the mixture was stirred and heated to reflux and 4.2 parts of 36 percent aqueous formaldehyde was added. Reflux was continued for 3½ hours and then the reaction mixture was cooled, acidified, an extracted with ether. The ether extract was evoporated, leaving a liquid residue which was shown by vapor phase chromatographic analysis to contain 2,6-di-tert-butyl-$\alpha$-(n-dodecylthio)-p-cresol.

EXAMPLE 3

To the reaction vessel described in Example 1 was added 79 parts of isopropanol, 0.2 part of 86 percent potassium hydroxide pellets, 15.1 parts of 1-dodecanethiol and 4.2 parts of 36 percent formaldehyde solution. This mixture was stirred and heated to its boiling point. Following this, a solution of 10.3 parts of 2,6-di-tert-butylphenol in 40 parts of isopropanol was added over a one hour period. Reflux was continued for 24 hours, following which the mixture was cooled, acidified, and extracted with ether. The ether was evaporated and the volatile material removed from the product under vacuum (0.07 mm.) at 150° C. A 62 percent yield of 2,6-di-tert-butyl-$\alpha$-(n-dodecylthiol)-p-cresol was obtained.

EXAMPLE 4

To the reaction vessel of Example 1 was added 80 parts of isopropanol, 0.4 part of potassium hydroxide, 30.2 parts of 1-dodecanethiol and 12.6 parts of 36 percent aqueous formaldehyde. This mixture was stirred and heated to reflux, at which time 20.6 parts of 2,6-di-tert-butylphenol was added. The mixture was heated at reflux for 2 hours, at which time vopor phase chromatographic analysis indicated that the reaction was essentially complete. The reaction mixture was acidified and extracted with ether. The ether extract was dried and evaporated, yielding 49 parts of a yellow oil. This oil was distilled at 187–8° C. at 0.07 mm., yielding 2,6-di-tert-butyl-$\alpha$-(n-dodecylthio)-p-cresol.

EXAMPLE 5

To the reaction vessel of Example 1 add 500 parts of isopropanol, 35 parts of p-formaldehyde, 5.7 parts of potassium hydroxide and 185 parts of n-decyl mercaptan. Heat the mixture to reflux while stirring and hold at reflux for 15 minutes. Following this, add 206 parts of 2,4-di-tert-butylphenol and stir at reflux for 2 hours. Cool the mixture and add 500 parts of water. Remove the aqueous phase containing most of the isopropanol solvent and distill the remaining volatile components from the residue by heating to 100° C. while maintaining at 0.1 mm. Hg. The residue is primarily 2,4-di-tert-butyl-$\alpha$-(n-decylthiol)-o-cresol.

The above example can be carried out using other phenols to obtain the corresponding product. For example, 6-tert-butyl-p-cresol yields 2-tert-butyl-4-methyl-$\alpha$-(n-decylthiol)-o-cresol. 2,6-di($\alpha$ - methylbenzyl)phenol forms 2,6-di($\alpha$ - methylbenzyl)-$\alpha$-(n-decylthiol)-p-cresol. The use of 6-tert-butyl-o-cresol results in 2-methyl-6-tert-butyl-$\alpha$-(n-decylthiol)-p-cresol. Likewise, 6-sec-dodecyl-p-cresol yields 2-sec-dodecyl - 4 - methyl-$\alpha$-(n-decylthiol)-o-cresol.

EXAMPLE 6

In a pressure reaction vessel place 164 parts of 6-tert-butyl-o-cresol, 35 parts of p-formaldehyde and 100 parts of n-butyl mercaptan. Seal the vessel and, while stirring, heat to 200° C. Hold the vessel contents at this temperature for 2 hours, and then cool and discharge the vessel contents. Remove the volatile unreacted components from the mixture by heating the product to 150° C. under vacuum (0.1 mm. Hg). The resulting residue contains a substantial amount of 2-methyl-6-tert-butyl-$\alpha$-(n-butylthiol)-p-cresol.

EXAMPLE 7

In the reaction vessel of Example 1 place 1000 parts of isopropanol, 120 parts of ethylene mercaptan, 75 parts of p-formaldehyde and 1.2 parts of potassium hydroxide. While stirring, heat the mixture to reflux and, after 30 minutes, slowly add 412 parts of 2,6-di-tert-butylphenol over a one hour period. Continue refluxing for 3 additional hours, and then cool the mixture and add 500 parts of water. Remove the aqueous phase containing most of the isopropanol and dissolve the remaining product in 1000 parts of toluene. Wash the toluene soltuion with water and then distill off the toluene and other volatiles under vacuum, leaving $\alpha,\alpha'$-ethylene dithiobis(2,6-di-tert-butyl-p-cresol).

In the above example, other dimercaptans can be used to give the corresponding $\alpha,\alpha'$-dithiobis(p-cresol). For example, 1,3-dimercapto propane forms $\alpha,\alpha'$-trimethylene dithiobis(2,6-di-tert-butyl-p-cresol). Similarly, 1,6-dimercapto-3,3-dimethylhexane yields $\alpha,\alpha'$-(3,3-dimethyl-1,6-hexane dithiobis)-2,6-di-tert-butyl-p-cresol.

Also, other alkali metal hydroxides such as sodium hydroxide and lithium hydroxide can be employed as catalysts. In a similar manner, other solvents can be used such as tert-butyl alcohol, sec-butyl alcohol, dioxane, ethyleneglydol dimethyl ether, dimethyl sulfoxide, and the like.

In the above example, other phenols can be substituted to give the corresponding $\alpha,\alpha'$-ethylene dithiobis (cresol). For example, the use of 6-tert-butyl-o-cresol yields $\alpha,\alpha'$-ethylene dithiobis(2-methyl-6-tert-butyl-p-cresole). Likewise, 2,6-di-($\alpha$-methylbenzyl)phenol forms $\alpha,\alpha'$-ethylene dithiobis [2,6-di-($\alpha$-methylbenzyl)-p-cresol]. 2,6-dicyclohexylphenol results in $\alpha,\alpha'$-ethylene dithiobis(2,6-dicyclohexyl-p-cresol). 2,4-di-tert-butylphenol yields $\alpha,\alpha'$-ethylene dithiobis(4,6 - di - tert-butyl-o-cresol). 2-tertbutyl-4-methylphenol forms $\alpha,\alpha'$ethylene dithiobis(4-methyl-6-tert-butyl-o-cresol). Likewise, 2-sec-dodecyl-4-methylphenol yields $\alpha,\alpha'$-ethylene dithiobis(4-methyl-6-sec-dodecyl-o-cresol).

The products made by this process are useful antioxidants. They are especially useful in protecting rubber such as styrene-butadiene rubber, ethylene-propylene rubber, ethylene - propylene - dicyclopentadiene terpolymer, ethylene-propylene-1,5-cyclooctadiene rubber, poly-butadiene rubber, poly-cis-butadiene rubber, poly-isoprene, and the like. The following examples illustrate typical formulations employing products of the present process.

EXAMPLE 8

The following ingredients are blended on a Banbury blender:

| | Parts by weight |
|---|---|
| Pale crepe rubber | 100 |
| Zinc oxide filler | 50 |
| Titanium odioxide | 25 |
| Stearic acid | 2 |
| Ultramarine blue | 0.12 |
| Sulfur | 3 |
| Mercaptobenzothiazole | 1 |
| 2,6-di-tert-butyl-α-(n-dodecylthiol)-p-cresol | 1 |

After formulation and blending of the above ingredients, the compounded rubber is cured for 30 minutes at 274° F. in clean molds requiring no mold lubricant. The resulting vulcanized natural rubber product is resistant to oxidative degradation.

EXAMPLE 9

An SBR rubber is formulated as follows:

| | Parts by weight |
|---|---|
| SBR crum (S/B ratio 48/52) | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| Benzothiazyl disulfide | 0.4 |
| Amine activator | 0.5 |
| α,α'-Ethylene dithiobis-(2,6-di-tert-butyl-p-cresol) | 5 |

After mixing the above formulation of a Banbury blender, the formulated rubber is vulcanized for 60 minutes at 280° F. in rubber molds, resulting in a light-colored rubber stock of good stability.

What is claimed is:

1. A process for preparing compounds selected from the group consisting of compounds having the formulas:

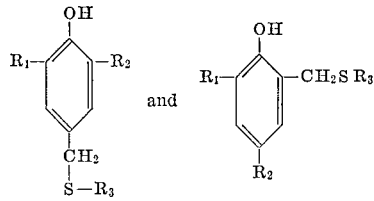

wherein $R_1$ and $R_2$ are selected from the group consisting of alkyl radicals containing 1 to 12 carbon atoms, aralkyl radicals containing 7 to 12 carbon atoms and cycloalkyl radicals containing 6 to 12 carbon atoms, and $R_3$ is selected from the group consisting of alkyl radicals containing 1 to 20 carbon atoms, cycloalkyl radicals containing 6 to 20 carbon atoms, aryl radicals containing 6 to 20 carbon atoms, aralkyl radicals containing 7 to 20 carbon atoms, and radicals having the formulas:

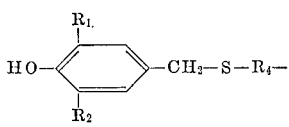

and

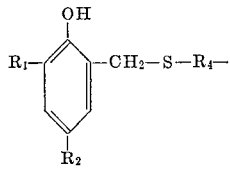

wherein $R_1$ and $R_2$ are the same as above and $R_4$ is a divalent aliphatic hydrocarbon radical containing from 2 to 12 carbon atoms, said process comprising reacting a phenol selected from the group consisting of phenols having the formulas:

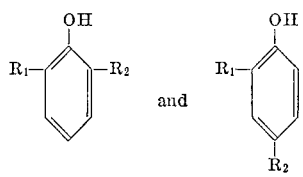

and

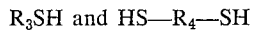

wherein $R_1$ and $R_2$ are the same as above, with formaldehyde and a mercaptan selected from the group consisting of mercaptans having the formulas:

$$R_3SH \text{ and } HS—R_4—SH$$

wherein $R_3$ and $R_4$ are the same as above, in the presence of a base catalyst at a temperature of from about 50 to 200° C.

2. The process of claim 1 wherein said base catalyst is an alkali metal hydroxide.

3. The process of claim 2 for preparing 2,6-dialkyl-α-(alkylthio)-p-cresol, said process comprising reacting one mole equivalent of a 2,6-dialkylphenol with from about 0.75 to 3 equivalents of formaldehyde and from about 0.9 to 3 equivalents of an alkyl mercaptan.

4. The process of claim 3 comprising:
(A) mixing from about 0.9 to 3 mole equivalents of an alkyl mercaptan, from about 0.75 to 3 moles of formaldehyde and a catalytic amount of an alkali metal hydroxide,
(B) heating the mixture to a temperature above about 50° C., and
(C) adding one mole of a 2,6-dialkylphenol and allowing the resultant mixture to react at a temperature of from about 50–150° C.

5. The process of claim 4 wherein said alkyl mercaptan contains from about 6 to 20 carbon atoms and said 2,6-dialkylphenol is a 2,6-di-(α-branched alkyl) phenol wherein said α-branched alkyl groups contain from 3 to 12 carbon atoms.

6. The process of claim 5 for preparing 2,6-di-tert-butyl-α-(n-dodecylthio)-p-cresol, said process comprising:
(A) mixing from about 0.9 to 3 equivalents of n-dodecyl mercaptan, from about 1 to 3 mole equivalents of formaldehyde and from about 0.005 to 0.1 mole equivalent of potassium hydroxide in a solvent selected from the group consisting of secondary and tertiary alcohols containing from 3 to 6 carbon atoms,
(B) heating the mixture to a temperature of from about 50° C. to the boiling point of said mixture, and
(C) adding one mole equivalent of 2,6-di-tert-butylphenol and allowing the resultant mixture to react at a temperature of from about 50° C. to the boiling point of said resultant mixture.

7. The process of claim 2 for preparing α,α'-alkylene dithiobis-(2,6-dialkyl-p-cresol), said process comprising reacting two moles of a 2,6-dialkylphenol with from about 1.75 to 6 moles of formaldehyde and from about 0.9 to 3 moles of ethylene mercaptan.

8. The process of claim 7 comprising:
(A) mixing from about 1.75 to 6 moles of formaldehyde, from about 0.9 to 3 moles of ethylene mercaptan and a catalytic amount of an alkali metal hydroxide,
(B) heating the mixture to a temperature above about 50° C., and
(C) adding 2 moles of a 2,6-dialkylphenol and allowing the resultant mixture to react at a temperature from about 50–150° C.

9. The process of claim 8 wherein said 2,6-dialkylphenol is a 2,6-di-(α-branched alkyl)phenol wherein each α-branched alkyl group contains from 3 to 12 carbon atoms.

10. The process of claim 9 for preparing α,α-alkylene dithiobis(2,6-di-tert-butyl-p-cresol), said process comprising:
  (A) mixing from about 1.9 to 6 mole equivalents of formaldehyde, from about 0.9 to 3 mole equivalents of ethylene mercaptan and from about 0.01 to 0.2 mole equivalent of potassium hydroxide in a solvent selected from the group consisting of secondary and tertiary alcohols containing from 3 to 6 carbon atoms,
  (B) heating the mixture to a temperature of from about 50° C. to the boiling point of said mixture, and
  (C) adding 2 mole equivalents of 2,6-di-tert-butylphenol and allowing the resultant mixture to react at a temperature of from about 50° C. to the boiling point of said resultant mixture.

References Cited

UNITED STATES PATENTS 2,322,376 6/1943 McCleary et al. _____ 250—48
2,417,118 3/1947 McCleary et al. _____ 260—609

OTHER REFERENCES

Walker: "Fomaldehyde," 3rd ed. (1953), pp. 310–315.
Reid: "Chemistry of Bivalent Sulfur" (1960), p. 17.

CHARLES B. PARKER, Primary Examiner

D. R. PHILLIPS, Assistant Examiner

U.S. Cl. X.R.

252—404; 260—799

PO-1050
(5/69)

UNITED STATES PATENT OFFICE
CERTIFICATE OF CORRECTION

Patent No. 3,553,270           Dated January 5, 1971

Inventor(s)  John C. Wollensak and Bernard R. Meltsner

It is certified that error appears in the above-identified patent and that said Letters Patent are hereby corrected as shown below:

Column 1, line 63, "phenyl" should read -- phenol --.
Column 2, line 18, in Formula (II), that portion of the formula reading "-CH$_2$SR$_2$" should read -- -CH$_2$SR$_3$ --; line 45, in Formula (IV), that portion of the formula reading "-CH$_2$-S-R$_3$-" should read -- -CH$_2$-S-R$_4$- --; line 61, in Formula (VI), insert " | " at bottom of benzene ring. Column 4, line 38, "1.6"
       R$_2$
should read -- 1.5 --. Column 8, Claim 10, at line 75, "α,α-alkylene" should read -- α,α'-alkylene --.

Signed and sealed this 8th day of June 1971.

(SEAL)
Attest:

EDWARD M.FLETCHER,JR.                    WILLIAM E. SCHUYLER, J
Attesting Officer                        Commissioner of Patent

Disclaimer 3,553,270.—*John C. Wollensak* and *Bernard R. Meltsner*, Royal Oak, Mich. PREPARATION OF PHENOLIC THIOETHERS. Patent dated Jan. 5, 1971. Disclaimer filed Sept. 14, 1973, by the assignee, *Ethyl Corporation*.

Hereby enters this disclaimer to claims 1, 2, 3 and 7 of said patent.

[*Official Gazette December 25, 1973.*]